United States Patent

Quan

[11] Patent Number: 5,712,617
[45] Date of Patent: Jan. 27, 1998

[54] INERTIA BRAKELIGHT FLASHER

[76] Inventor: Hon Wai Quan, 4545 Victoria Dr., Vancouver, BC, Canada, V5N 4N7

[21] Appl. No.: 402,874

[22] Filed: Mar. 13, 1995

[51] Int. Cl.$^6$ ............................................. B60Q 1/50
[52] U.S. Cl. .................. 340/467; 340/468; 340/478; 340/479; 340/686; 340/689; 200/61.45 R; 200/61.48; 200/61.51
[58] Field of Search .................................. 340/467, 468, 340/469, 478, 479, 686, 689; 200/61.45 R, 61.52, 61.48–61.51

[56] References Cited

U.S. PATENT DOCUMENTS

| | | | |
|---|---|---|---|
| 3,674,950 | 7/1972 | Scoville | 200/61.48 |
| 3,693,151 | 9/1972 | Hasegawa et al. | 340/72 |
| 4,496,808 | 1/1985 | Alexander | 200/61.45 |
| 4,513,629 | 4/1985 | Keller et al. | 200/61.45 |
| 4,938,140 | 7/1990 | Kinoshita et al. | 200/61.53 |
| 5,089,805 | 2/1992 | Salsman | 340/479 |
| 5,168,138 | 12/1992 | Evans | 200/61.45 |
| 5,309,141 | 5/1994 | Mason et al. | 340/467 |
| 5,442,333 | 8/1995 | Bailey | 340/479 |
| 5,499,011 | 3/1996 | Young | 340/479 |

*Primary Examiner*—Jeffery Hofsass
*Assistant Examiner*—Ashok Mannava

[57] ABSTRACT

A flasher for intermittently operating a third brakelight in response to a predetermined deceleration of a vehicle. The inventive device includes a flasher relay electrically couplable to the power supply line of the third brakelight. A mechanical deceleration sensor is electrically coupled to the flashing relay to effect operation thereof during a predetermined deceleration of the vehicle. The mechanical deceleration sensor is pivotally mounted to the vehicle so as to remain level during traversing of the vehicle over inclined or declined terrain.

7 Claims, 3 Drawing Sheets

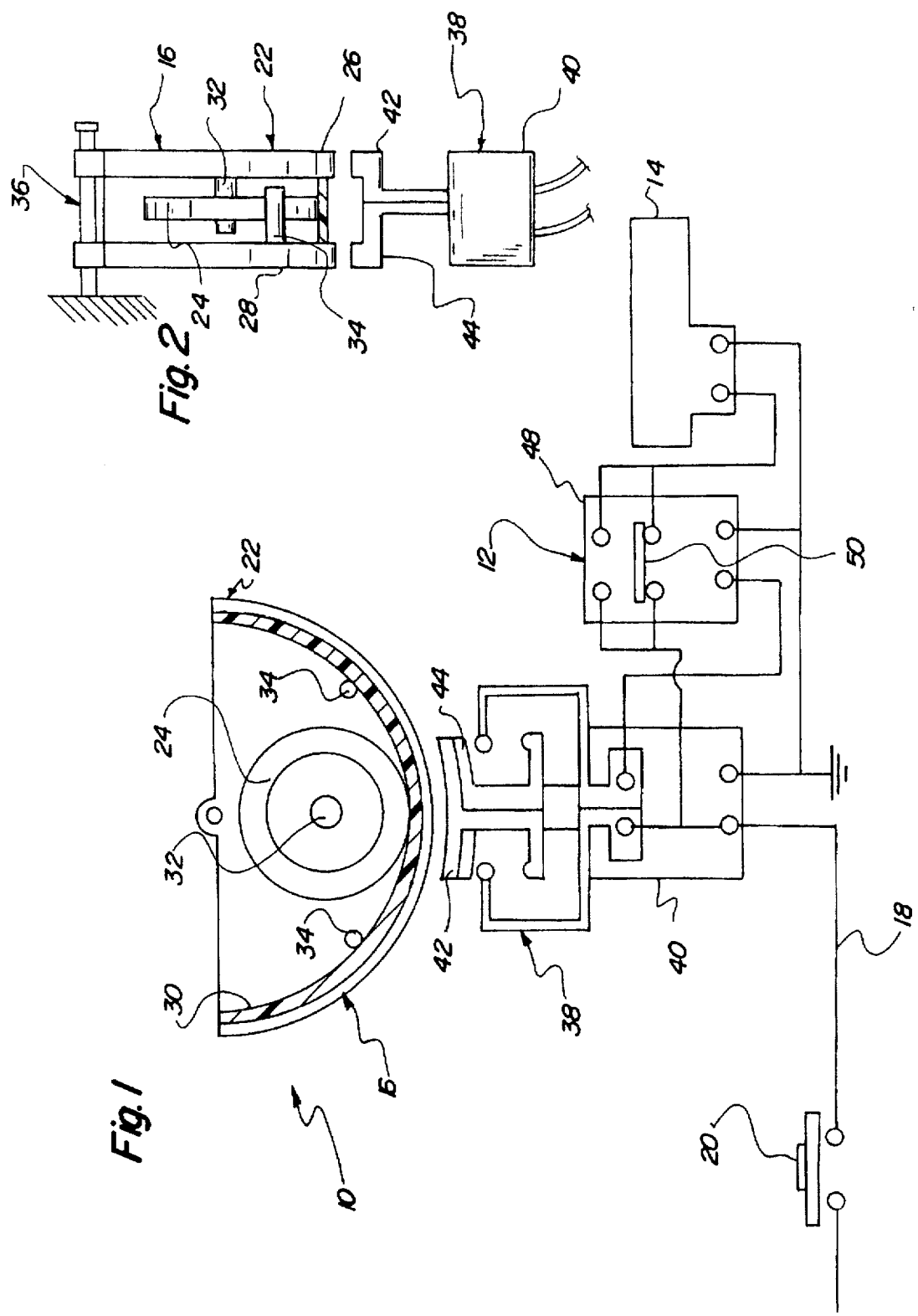

INERTIA BRAKELIGHT FLASHER

BACKGROUND OF THE INVENTION

1. Field of the Invention

The present invention relates to vehicle indicator operating circuits and more particularly pertains to an inertia brakelight flasher for intermittently operating a third brakelight in response to a predetermined deceleration of a vehicle.

2. Description of the Prior Art

The use of vehicle indicator operating circuits is known in the prior art. More specifically, vehicle indicator operating circuits heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle indicator operating circuits include U.S. Pat. No. 5,089,805; U.S. Pat. No. 3,460,089; U.S. Pat. No. 5,148,147; U.S. Pat. No. 3,693,151; U.S. Pat. No. 4,983,952; and U.S. Pat. No. 5,172,095.

While these devices fulfill their respective, particular objectives and requirements, the aforementioned patents do not disclose an inertia brakelight flasher for intermittently operating a third brakelight which includes a flashing relay electrically couplable to the power supply line of a third brakelight, and a mechanical deceleration sensor electrically coupled to the flashing relay to effect operation thereof during a predetermined deceleration of the vehicle, wherein the mechanical deceleration sensor is pivotally mounted to the vehicle so as to remain level.

In these respects, the inertia brakelight flasher according to the present invention substantially departs from the conventional concepts and designs of the prior art, and in so doing provides an apparatus primarily developed for the purpose of intermittently operating a third brakelight in response to a predetermined deceleration of a vehicle.

SUMMARY OF THE INVENTION

In view of the foregoing disadvantages inherent in the known types of vehicle indicator operating circuits now present in the prior art, the present invention provides a new inertia brakelight flasher construction wherein the same can be utilized for intermittently operating a third brakelight of a vehicle. As such, the general purpose of the present invention, which will be described subsequently in greater detail, is to provide a new inertia brakelight flasher apparatus and method which has many of the advantages of the vehicle indicator operating circuits mentioned heretofore and many novel features that result in an inertia brakelight flasher which is not anticipated, rendered obvious, suggested, or even implied by any of the prior art vehicle indicator operating circuits, either alone or in any combination thereof.

To attain this, the present invention generally comprises a flasher for intermittently operating a third brakelight in response to a predetermined deceleration of a vehicle. The inventive device includes a flasher relay electrically couplable to the power supply line of the third brakelight. A mechanical deceleration sensor is electrically coupled to the flashing relay to effect operation thereof during a predetermined deceleration of the vehicle. The mechanical deceleration sensor is pivotally mounted to the vehicle so as to remain level during traversing of the vehicle over inclined or declined terrain.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new inertia brakelight flasher apparatus and method which has many of the advantages of the vehicle indicator operating circuits mentioned heretofore and many novel features that result in an inertia brakelight flasher which is not anticipated, rendered obvious, suggested, or even implied by any of the prior art vehicle indicator operating circuits, either alone or in any combination thereof.

It is another object of the present invention to provide a new inertia brakelight flasher which may be easily and efficiently manufactured and marketed.

It is a further object of the present invention to provide a new inertia brakelight flasher which is of a durable and reliable construction.

An even further object of the present invention is to provide a new inertia brakelight flasher which is susceptible of a low cost of manufacture with regard to both materials and labor, and which accordingly is then susceptible of low prices of sale to the consuming public, thereby making such inertia brakelight flashers economically available to the buying public.

Still yet another object of the present invention is to provide a new inertia brakelight flasher which provides in the apparatuses and methods of the prior art some of the advantages thereof, while simultaneously overcoming some of the disadvantages normally associated therewith.

Still another object of the present invention is to provide a new inertia brakelight flasher for intermittently operating a third brakelight in response to a predetermined deceleration of a vehicle.

Yet another object of the present invention is to provide a new inertia brakelight flasher which includes a flashing relay electrically couplable to the power supply line of a third brakelight, and a mechanical deceleration sensor electrically coupled to the flashing relay to effect operation thereof during a predetermined deceleration of the vehicle.

Even still another object of the present invention is to provide a new inertia brakelight flasher wherein the mechanical deceleration sensor is pivotally mounted to the vehicle so as to remain level.

Even still yet another object of the present invention is to provide a new inertia brakelight flasher which can be easily installed within a vehicle utilizing existing wires.

Even yet still another object of the present invention is to provide a new inertia brakelight flasher which includes a locking solenoid for securing the deceleration sensor in response to a predetermined condition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view, partially in cross section, and including a diagrammatic circuitry illustration of an inertia brakelight flasher according to the present invention.

FIG. 2 is a side elevation view of a deceleration sensor means according to the present invention.

DESCRIPTION OF THE PREFERRED EMBODIMENT

Figure 3:
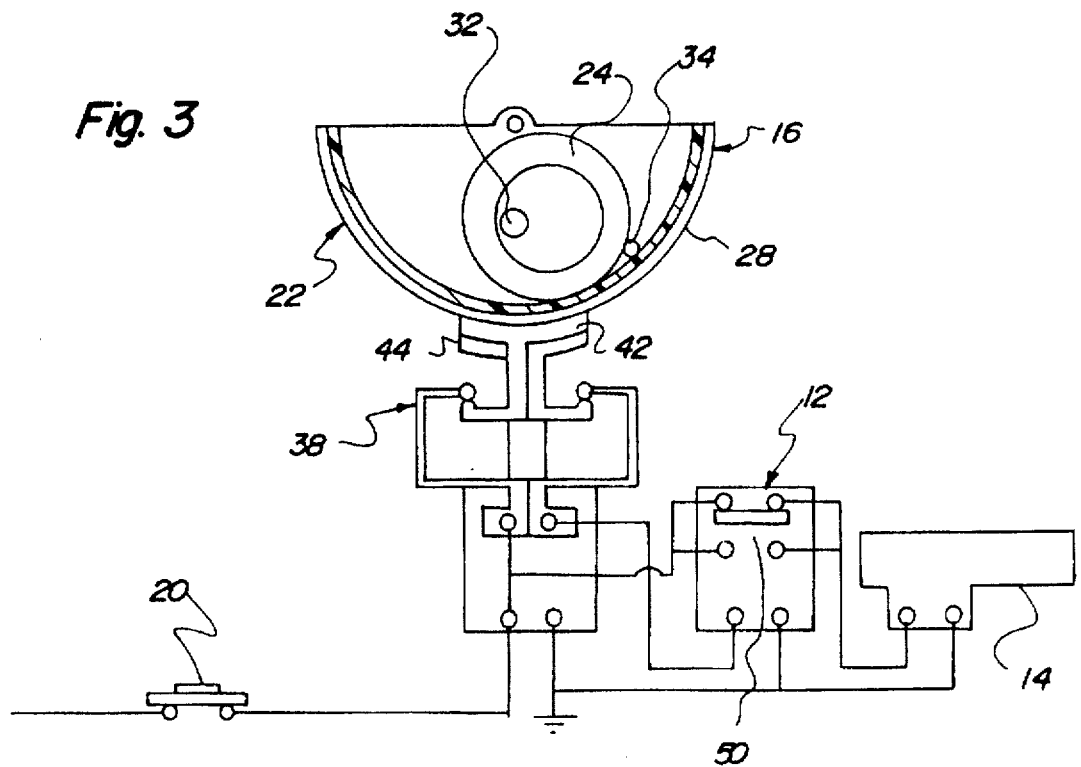
FIG. 3 is a cross sectional view of the invention illustrating operation thereof during deceleration of a vehicle.
Figure 4:
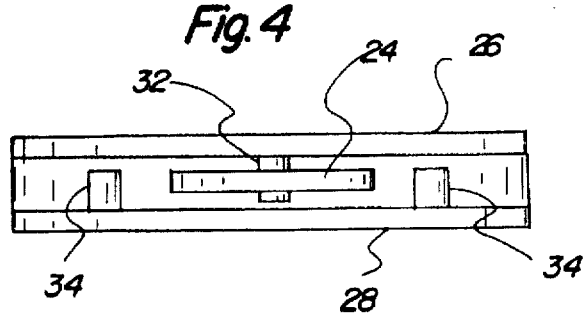
FIG. 4 is a top plan view of the deceleration sensor means.

With reference now to the drawings, and in particular to FIGS. 1-5 thereof, a new inertia brakelight flasher embodying the principles and concepts of the present invention and generally designated by the reference numeral 10 will be described.

More specifically, it will be noted that the inertia brakelight flasher 10 comprises a flashing relay means 12 electrically couplable to a third brakelight 14 of an unillustrated vehicle for effecting intermittent operation or flashing of the third brakelight. A deceleration sensor means 16 is electrically coupled to the flashing relay means 12 and is electrically couplable to a power supply line 18 for effecting energization of the flashing relay means 12 in response to actuation of a brakelight switch 20 to which the power supply line 18 is electrically connected. By this structure, the deceleration sensor means 16 will detect deceleration of the associated vehicle during braking to energize the flashing relay means 12, whereby the third brakelight 14 is flashed to warn other drivers of such deceleration.

As best illustrated in FIGS. 1 through 4, it can be shown that the deceleration sensor means 16 according to the present invention 10 preferably comprises an outer pendulum 22 having an inner pendulum 24 movably mounted therewithin such that a movement of the inner pendulum 24 relative to the outer pendulum 22 effects actuation of the deceleration sensor means 16 to energize the flashing relay means 12. The outer pendulum 22, as shown in FIG. 2, comprises a first conductive side 26 supported in a substantially in a spaced and parallel orientation relative to a second conducting side 28 by an arcuate insulator 30 extending therebetween. The inner pendulum 24 comprises an annular ring formed of a conductive material which is positioned between the first conductive side 26 and the second conductive side 28 of the outer pendulum 22. A center contact 32 extends from the first conductive side 26 of the outer pendulum 22 and through a center of the annular ring of the inner pendulum 24. A pair of lateral contacts 34 extend from the second conductive side 28 of the outer pendulum 22 and are positioned in a spaced relationship from the annular ring of the inner pendulum 24 along respectively opposed sides thereof. By this structure, a deceleration of the outer pendulum 22, such as when attached to a decelerating vehicle, will cause the inner pendulum 24 to roll along the arcuate insulator 30 and into the position illustrated in FIG. 3, wherein electrical communication between the center contact 32 and one of the lateral contacts 34 is permitted through the conductive annular ring of the inner pendulum 24 to effect energization of the flashing relay means 12.

Figure 5:
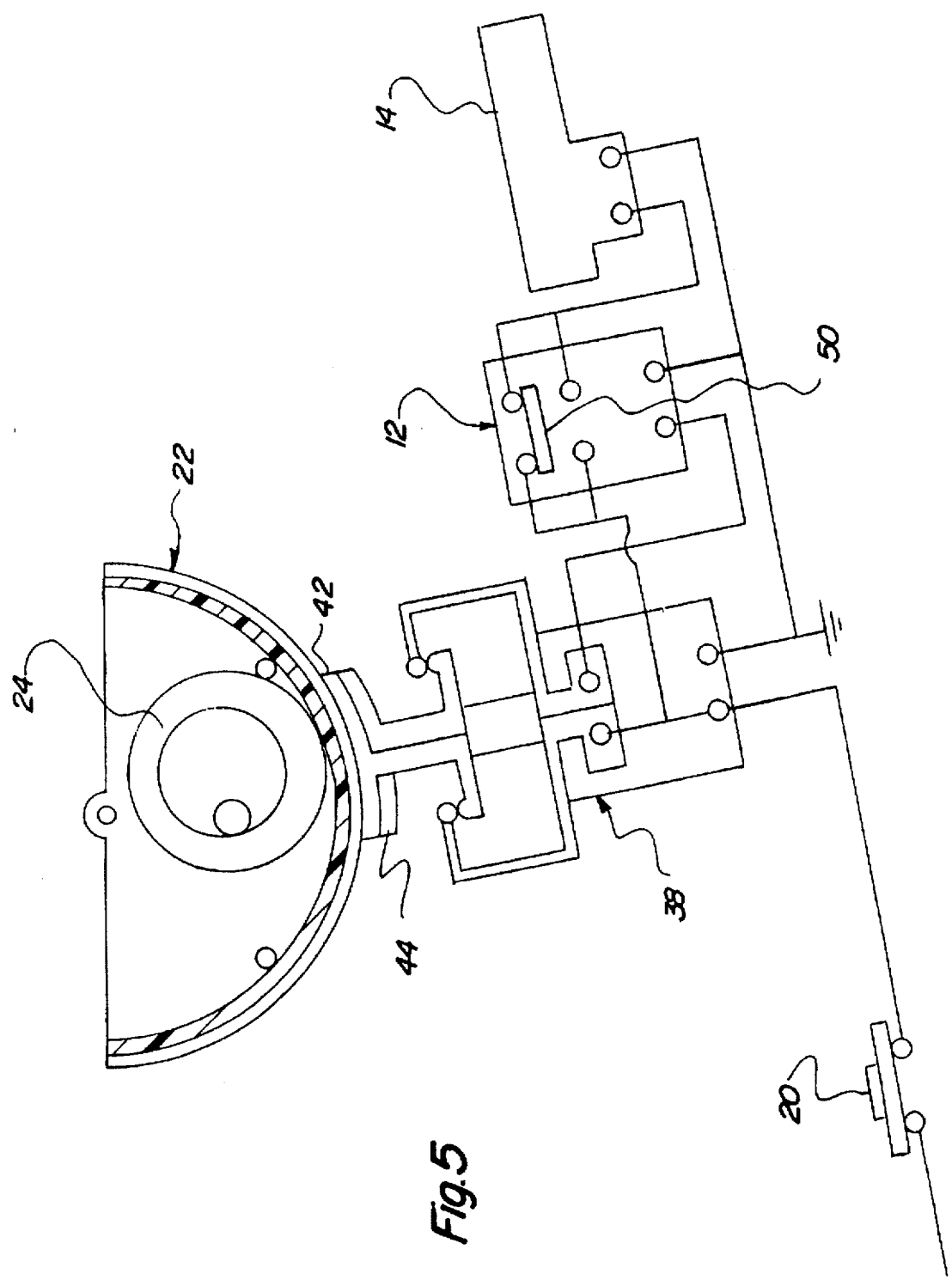
FIG. 5 is a side elevation view, partially in cross section, of the invention during deceleration of the vehicle traveling along an inclined surface.

As shown in FIG. 2, the outer pendulum 22 is preferably mounted within an unillustrated vehicle by a pivotal mounting means 36 such that the outer pendulum 22 remains level during traversing of the vehicle over inclined or declined terrain such as is illustrated in FIG. 5. However, during deceleration of the vehicle the outer pendulum 22 must be fixed so as to remain level such that only the inner pendulum 24 is allowed to pivot or roll relative to a remainder of the device 10. To this end, a locking solenoid means 38 is provided with the present invention 10 for securing a position of the outer pendulum 22 in response to energization of the power supply line 18 and for providing electrical communication between the conductive sides 26, 28 of the outer pendulum 22 and the flashing relay means 12. The locking solenoid means 38 comprises a solenoid 40 mounted proximal to the outer pendulum 22. A first contact 42 is mounted to the solenoid 40 and positioned for engagement with the first conductive side 26 of the outer pendulum 22. Similarly, a second contact 44 is mounted to the solenoid 40 and positioned for engagement with the second conductive side 28 of the outer pendulum 22. The first contact and the second contact 42 and 44 are electrically coupled to the flashing relay means 12 so as to permit communication between the flashing relay means and the power supply line 18 when the brakelight switch 20 is depressed and the inner pendulum 24 is in electrical communication with the center contact 32 and one of the lateral contacts 34, such as occurs during deceleration of the associated vehicle. Preferably, the first and second contacts 42 and 44 communicate with the flashing relay means 12 through an unlabeled pair of secondary contacts which engage during energization of the solenoid 40. Such configuration of the secondary contacts precludes fatiguing motion of wires during use of the device 10.

As best illustrated in FIG. 1, the flashing relay means 12 according to the present invention 10 comprises an oscillating flasher 48 having a breaker bar 50 positioned in a normally closed configuration so as to provide electrical communication across the flasher for normal brake light operation. Upon energization of the flasher 48, the breaker bar 50 will oscillate between opposed pairs of contacts within the oscillating flasher to effect intermittent operation of the third brakelight 14 when electrically communicated thereto. Because the breaker bar 50 resides within a normally closed configuration, operation of the third brakelight 14 will still be accomplished should the oscillating mechanism of the flasher 48 become disabled. In other words, the third brakelight 14 will remain useful should the flashing relay means 12 of the present invention 10 fail for whatever reason.

In use, the inertia brakelight flasher 10 according to the present invention can be easily installed within a vehicle and interposed between the third brakelight 14 and the power supply line 18 of the brake circuit leading to the third brakelight. Upon actuation of the brakelight switch 20, the locking solenoid means 38 will position the first and second contacts 42 and 44 into electrical communication with the first conductive side 26 and the second conductive side 28, respectively, of the outer pendulum 22 to lock the outer pendulum in a level position relative to the gravitational horizontal. Upon continued application of the brakes of the associated vehicle, the inner pendulum 24 will be biased as a result of such deceleration into electrical communication with the center contact 32 and one of the lateral contacts 34 to effect electrical communication between the first and second contacts 42 and 44. Such electrical communication will energize the flashing relay means 12 to effect oscillation of the breaker bar 50 of the oscillating flasher 48 to intermittently operate the third brakelight 14. The device 10 serves to warn drivers behind an associated vehicle of deceleration of such vehicle. Subsequent to the rapid deceleration of the associated vehicle, the third brakelight 14 will operate in a continuous manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An inertia brakelight flasher comprising:

a flashing relay means electrically couplable to a third brakelight of a vehicle for effecting intermittent operation of the third brakelight;

a deceleration sensor means electrically coupled to the flashing relay means and electrically couplable to a power supply line of a brake system of the vehicle for effecting energization of the flashing relay means in response to actuation of a brakelight switch of the vehicle, wherein the deceleration sensor means operates to detect deceleration of the vehicle during braking to energize the flashing relay means, whereby the third brakelight is flashed to warn other drivers of deceleration of the vehicle; and the deceleration sensor means comprises an outer pendulum; an inner pendulum movably mounted within the outer pendulum such that a movement of the inner pendulum relative to the outer pendulum effects actuation of the deceleration sensor means to energize the flashing relay means, and locking solenoid means for securing a position of the outer pendulum relative to the vehicle upon deceleration of the vehicle.

2. The inertia brakelight flasher of claim 1, wherein the outer pendulum comprises a first conductive side; a second conductive side supported in a substantially spaced and parallel orientation relative to the first conducting side; an arcuate insulator extending between the conductive sides, and further wherein the inner pendulum comprises an annular ring formed of a conductive material positioned between the first conductive side and the second conductive side of the outer pendulum, and wherein the locking solenoid means provides electrical communication between the first and second conductive sides when the locking solenoid means secures the outer pendulum.

3. An inertia brakelight flasher comprising:

a flashing relay means electrically couplable to a third brakelight of a vehicle for effecting intermittent operation of the third brakelight;

a deceleration sensor means electrically coupled to the flashing relay means and electrically couplable to power supply line of a brake system of the vehicle for effecting energization of the flashing relay means in response to actuation of a brakelight switch of the vehicle, wherein the deceleration sensor means operates to detect deceleration of the vehicle during braking to energize the flashing relay means, whereby the third brakelight is flashed to warn other drivers of deceleration of the vehicle; and the deceleration sensor means comprises an outer pendulum; an inner pendulum movably mounted within the outer pendulum such that a movement of the inner pendulum relative to the outer pendulum effects actuation of the deceleration sensor means to energize the flashing relay means, wherein the outer pendulum comprises a first conductive side; a second conductive side supported in substantially in a spaced and parallel orientation relative to the first conducting side; an arcuate insulator extending between the conductive sides, and further wherein the inner pendulum comprises an annular ring formed of a conductive material positioned between the first conductive side and the second conductive of the outer pendulum, wherein a center contact extends from the first conductive side of the outer pendulum and through a center of the annular ring of the inner pendulum; and a pair of lateral contacts extend from the second conductive side of the outer pendulum and are positioned in a spaced relationship from the annular ring of the inner pendulum along respectively opposed sides thereof, and wherein a deceleration of the outer pendulum will cause the inner pendulum to roll along the arcuate insulator and into electrical communication with the center contact and one of the lateral contacts.

4. The inertia brakelight flasher of claim 3, wherein the outer pendulum is pivotally mountable within the vehicle by a pivotal mounting means such that the outer pendulum remains level during traversing of the vehicle over inclined and declined terrain; and further comprising a locking solenoid means for securing a position of the outer pendulum relative to the vehicle in response to energization of the power supply line and for providing electrical communication between the conductive sides of the outer pendulum and the flashing relay means.

5. The inertia brakelight flasher of claim 4, wherein the locking solenoid means comprises a solenoid mounted proximal to the outer pendulum; a first contact mounted to the solenoid and positioned for engagement with the first conductive side of the outer pendulum; a second contact mounted to the solenoid and positioned for engagement with the second conductive side of the outer pendulum, the first contact and the second contact each being electrically coupled to the flashing relay means so as to permit communication between the flashing relay means and the power supply line when the inner pendulum is in electrical communication with the center contact and one of the lateral contacts during deceleration of the vehicle.

6. The inertia brakelight flasher of claim 5, wherein the first and second contacts communicate with the flashing relay means through a pair of secondary contacts which engage the first and second contacts during energization of the solenoid.

7. The inertia brakelight flasher of claim 6, wherein the flashing relay means comprises an oscillating flasher having a breaker bar positioned in a normally closed configuration so as to provide electrical communication across the flasher.

* * * * *